Aug. 25, 1936.    G. H. ANDERSSON    2,052,124
PROCESS OF SEPARATING PARAFFIN FROM FLUID HYDROCARBONS
Filed April 12, 1934    3 Sheets-Sheet 1

WITNESS:

INVENTOR
Gustav Harry Andersson
BY
ATTORNEYS

Aug. 25, 1936. G. H. ANDERSSON 2,052,124
PROCESS OF SEPARATING PARAFFIN FROM FLUID HYDROCARBONS
Filed April 12, 1934 3 Sheets-Sheet 2

WITNESS:
Robt R Kitchel

INVENTOR
Gustav Harry Andersson
BY
Busser and Harding
ATTORNEYS.

Aug. 25, 1936.  G. H. ANDERSSON  2,052,124
PROCESS OF SEPARATING PARAFFIN FROM FLUID HYDROCARBONS
Filed April 12, 1934  3 Sheets-Sheet 3

WITNESS:
Robt R Kitchel

INVENTOR
Gustav Harry Andersson
BY
Busser and Harding
ATTORNEYS.

Patented Aug. 25, 1936

2,052,124

UNITED STATES PATENT OFFICE 2,052,124

PROCESS OF SEPARATING PARAFFIN FROM FLUID HYDROCARBONS

Gustav Harry Andersson, Stockholm, Sweden, assignor to Aktiebolaget Separator-Nobel, Stockholm, Sweden, a corporation of Sweden Application April 12, 1934, Serial No. 720,225
In Germany April 15, 1933

4 Claims. (Cl. 196—19)

My invention relates to the process of centrifugally separating paraffin from a hydrocarbon solution, wherein the paraffin has been thrown out of solution by chilling, and more particularly to the separation of paraffin from a chilled solution of a paraffin base hydrocarbon oil and another heavy liquid which, at the temperature of chilling, does not form a solution with the paraffin to any substantial extent but does form a solution with the oil and which is of such high specific gravity that the specific gravity of the oil-heavy liquid solution is higher than that of the paraffin, whereby the paraffin will be displaced inward toward the axis of the centrifugal bowl, whence its continuous removal presents no serious difficulty. Such a process is set forth in the Backlund Patent No. 1,676,069 dated July 3, 1928.

The invention has for its object to effect a more nearly complete separation of the paraffin and the specified hydrocarbon solution.

In the drawings, which show means for carrying out the improved process:

Figure 1:
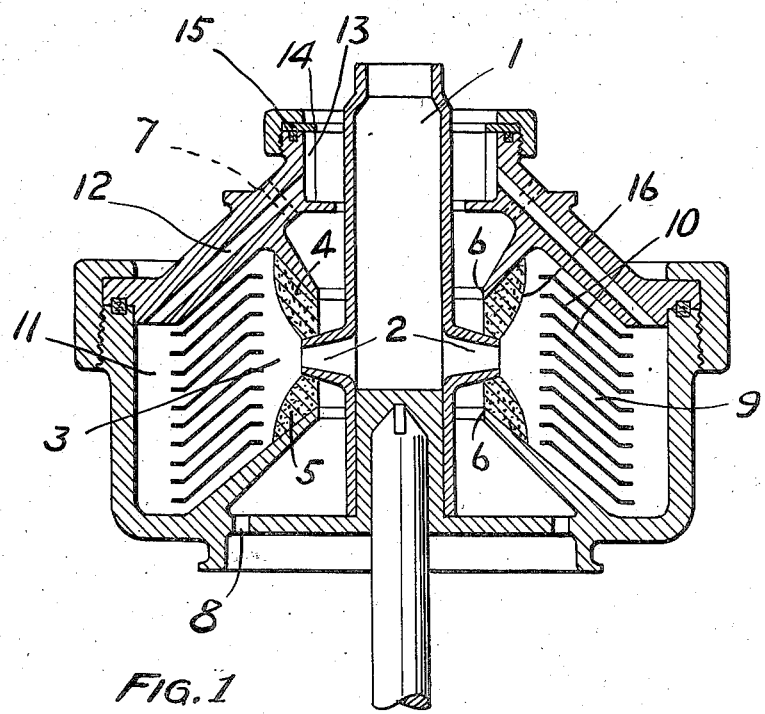
Fig. 1 is a vertical sectional view of a special type of centrifuge which has been used for carrying out the known process and which may be readily modified to carry out one or both separating steps of the improved process.

The mixture to be separated, consisting of paraffin particles in a solution of hydrocarbons, is fed into the central element 1 and then flows through channels 2 into the chamber 3 where a preliminary separation takes place. The separated paraffin deposits at 4 and 5 and leaves the bowl over the edges 6 and through the holes 7 and 8. The solution, which is now partly liberated from paraffin, flows from the chamber 3 through the spaces 9 between the discs 10 into the chamber 11. From the latter the solution, which has been liberated from paraffin in the pile of discs, flows through the channels 12 into the chamber 13, whence it is discharged over the edge 14 of the exchangeable regulating disc 15.

It is desirable that the solution streaming out over the edge 14 should be as free from paraffin as possible, which can be attained by providing a great number of intermediate discs in the bowl and by giving them as great dimensions as possible in a radial direction. It is also desirable that the concentrate of paraffin streaming out over the edges 6 shall contain as small a proportion of the solution as possible, which can be attained by arranging the edges 6 comparatively near to the axis of the bowl in relation to the edge 14. Thereby the discharge of the paraffin over the edges 6 is rendered more difficult, and the particles of paraffin accumulate at 4 and 5. By reason of the fact that the particles deposited further from the axis of the bowl press on those which are closer to it, the part of the deposits 4 and 5 situated near to the said axis is compressed and therefore comparatively free from solution. The force of the compression becomes greater the farther from the axis the deposits 4 and 5 extend, and it is therefore desirable that the chamber 3 shall have a large outer diameter. A great extension in a radial direction of the chamber 3 also has the advantage that the position of the outer surface 16 of the deposits may vary considerably (which variation cannot be avoided owing to differences in the composition etc. of the liquid to be separated) while avoiding the penetration of the deposits between the discs, which would cause a reduction of the separating capacity of the bowl or the production of a too thin paraffin concentrate. On the other hand, it is not possible to give a too great extension in radial direction to the chamber 3, as this would cause the separating capacity of the bowl to drop, owing to the reduction of the discs in the same direction. Further, the discs would then have central holes of such large diameter that they would be mechanically weak. It is true that it would be possible to obtain a larger space in radial direction, not only for the discs, but also for the mass of paraffin, by making a bowl of greater diameter, but other considerations, well understood by those skilled in the art, limit the practicable diameter of a centrifugal bowl.

I have found that the difficulties can be avoided by carrying through the separation in two stages. The bowl used for the first separation is adjusted to produce and separate a paraffin-free solution and a comparatively thin paraffin concentrate of low viscosity, which latter is concentrated in a second bowl of any suitable construction. It therefore is not necessary that the chamber 3 of the first bowl shall extend outward any substantial distance and the discs may consequently fill nearly the whole space of the bowl, which thus becomes particularly efficient. With a sufficiently thin concentrate the space 3 may be omitted and vertical channels provided instead. Nor is it then necessary to adjust the bowl very accurately in regard to the distance between the outlet openings and the rotation axis, as small variations in the composition of the concentrate are of minor importance.

The thin paraffin concentrate is then centrifuged in a bowl of known construction, which may also be provided with discs but is preferably of the open bowl type and may be provided with screens or wings of such a construction that they do not interfere with the movements of the paraffin mass. This bowl is adjusted so as to produce a paraffin which is as free as possible from the solution. This condition can easily be fulfilled in a bowl of this latter type, since the surface 16 of the deposit may extend as far as to the inner orifice of the outlet channels 12. If the bowl is provided with discs, these should have a large central hole, as shown in the drawings, so as to allow sufficient space for the paraffin. It is of no importance in this operation if the separated solution contains small amounts of paraffin, as the solution may again be brought into the process before the first separation. The solution produced in the first separation, on the other hand, should be free from paraffin, as the main product desired is a completely deparaffined oil. A further advantage of the method consists in the fact that the heating devices, used in connection with separators of known construction, for melting the paraffin flowing out of the collecting vessels, need be provided only in the small number of separators designed for the second separation.

The improved process has the further advantage that the outlets 7 and 8 may be arranged closer to the axis of the bowl, owing to the lower viscosity of the paraffin concentrate, which requires reduced power consumption for driving the bowl. The concentrate is thrown out into the collecting vessels surrounding the bowl at a low velocity, and the said vessels may therefore be of a simpler and cheaper design.

Figure 2:
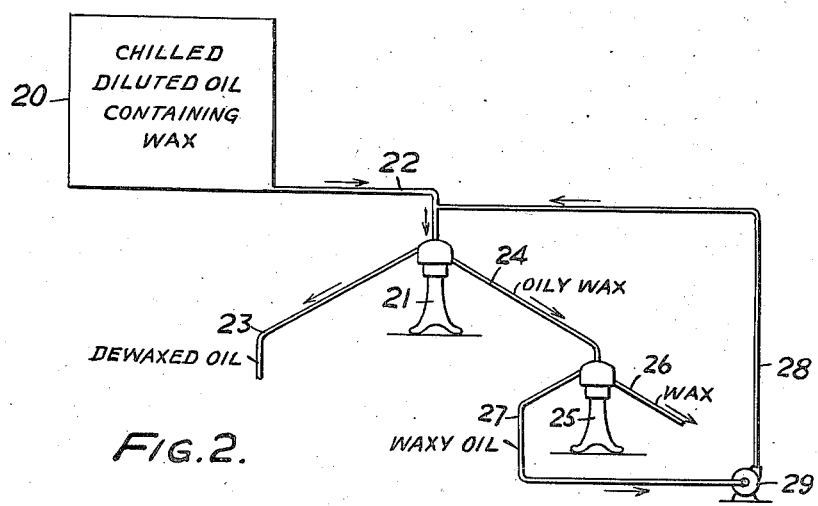
Fig. 2 is a diagram of an apparatus in which my process may be carried out.

A diagram of an apparatus by means of which the process may be practiced is shown in Fig. 2. The mixture to be separated, consisting of paraffin particles in a solution of hydrocarbons, is fed from a tank 20 to a centrifugal separator 21 through a pipe 22. In this separator the liquid is separated into a wax-free oil (which may be one of the final products and which is discharged through a pipe 23) and an oil containing wax. The waxy oil flows through a pipe 24 into another centrifugal separator 25, wherein it is split into an oil-free wax (which is discharged through a pipe 26) and an oil containing wax (which is discharged through a pipe 27).

The arrangement hereinbefore described may be amplified by taking the waxy oil discharged through pipe 27 back, by means of pump 29, through pipe 28, to pipe 22.

Figure 3:
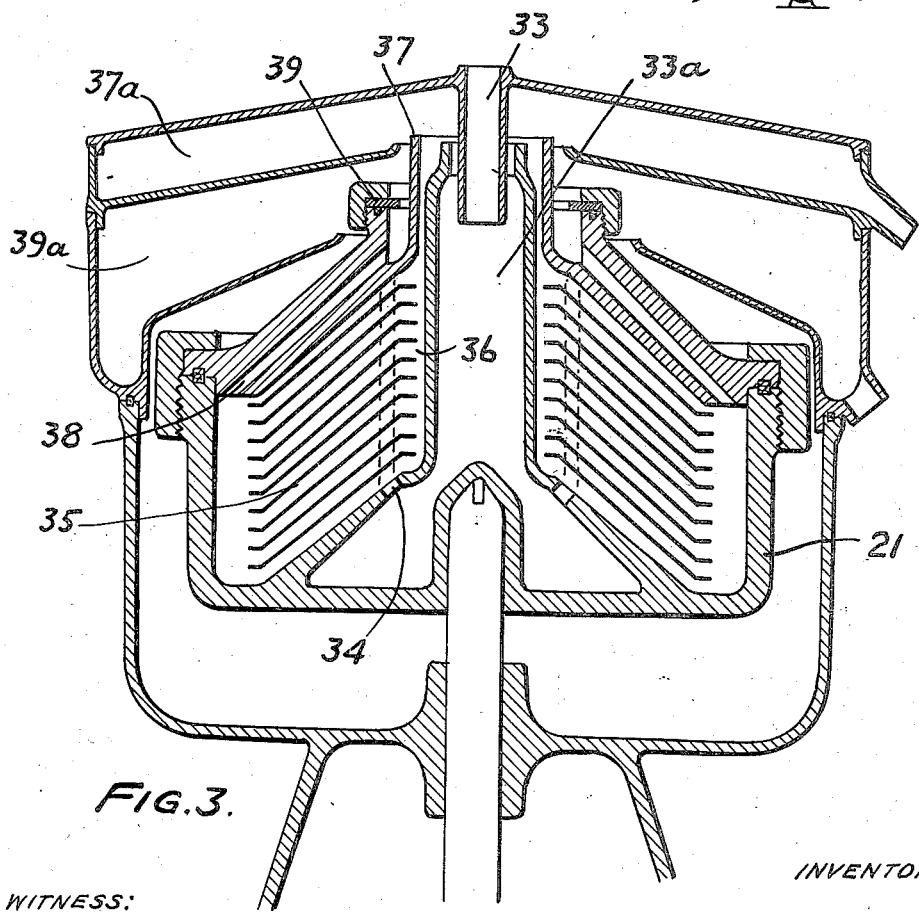
Fig. 3 is a vertical sectional view of one of different specific types of centrifuges which is adapted to carry out the first step of my process.
Figure 4:
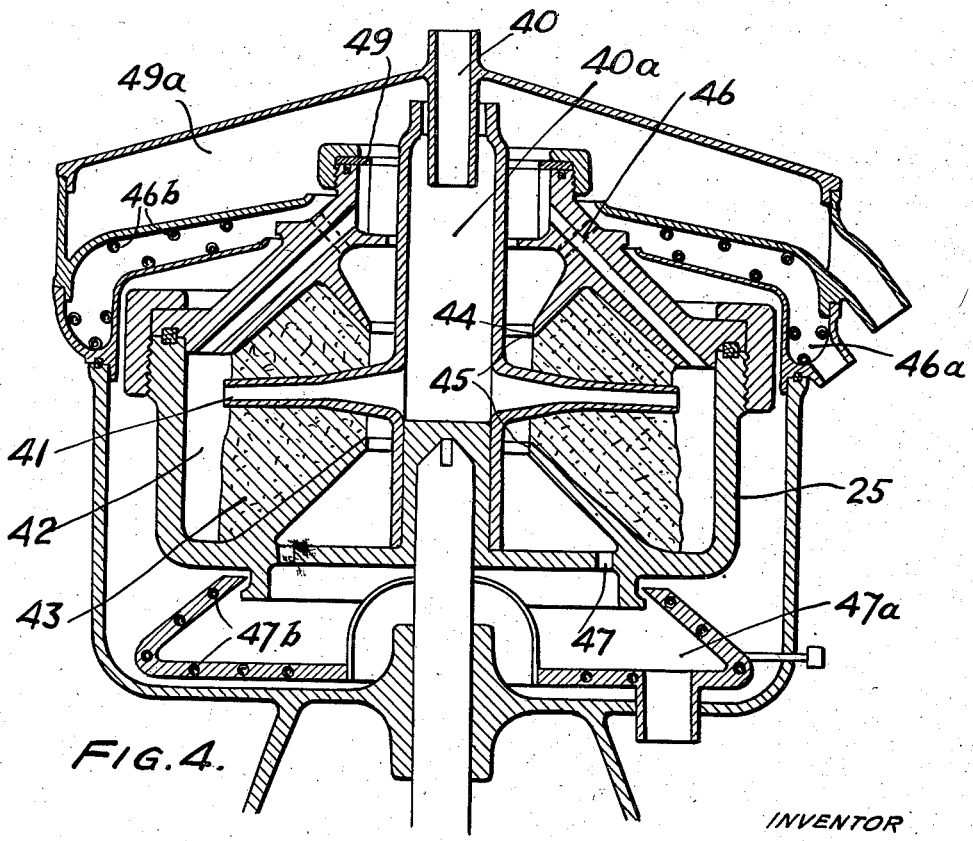
Fig. 4 is a vertical sectional view of one of different types of centrifuges in which the second step of my process is adapted to be carried out.

While, from the foregoing description, it is clear how the centrifuge illustrated in Fig. 1 may be variously modified to carry out each step of my improved process, Figs. 3 and 4 are added to illustrate centrifuges of specific construction which, without modification, may be efficiently utilized to practice the two described steps.

Into the bowl which is used in the first separation (which, in accordance with Figs. 2 and 5, may be designated 21) the mixture to be separated may be fed, through a tube 33, into a space 33a, whence it flows, through holes 34, into a pile of conical discs 35, between which the separation takes place. The wax concentrate, which is comparatively thin, is discharged through vertical channels 36, over the edge 37, into the receiving vessel 37a, while the wax-free oil is discharged, through the channels 38, over the edge of the gravity disc 39 into the vessel 39a.

Figure 5:
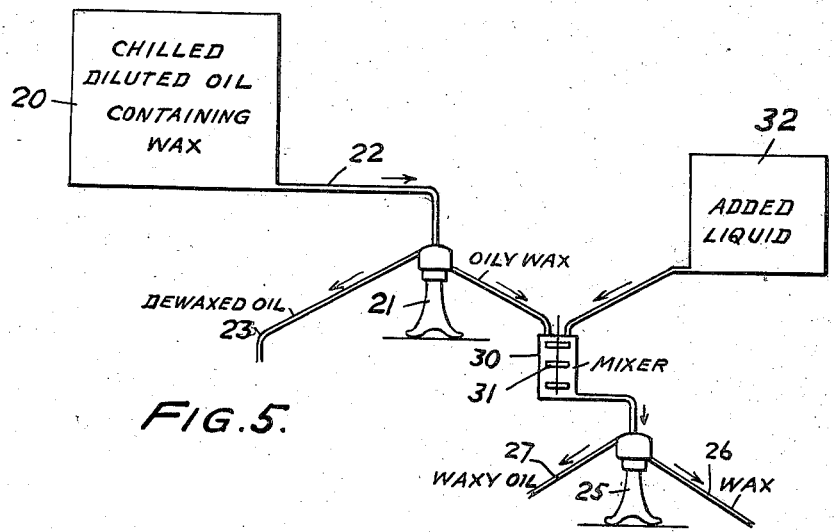
Fig. 5 is a diagram of a modified apparatus.

The wax concentrate discharged from the bowl 21 is then fed, through the tube 40, into the space 40a of the second separator (which, in accordance with Figs. 2 and 5, may be designated 25). From space 40a the wax concentrate passes, through the tubes 41, into the space 42, where the separation takes place. The bowl is so adjusted that there is obtained a wax layer 43 that is comparatively thick in radial direction, whereby the wax must pass a rather long way through the outlet. This results in the wax being effectively liberated from oil. The wax discharges from the bowl over the edges 44 and 45 and through holes 46 and 47 into the receiving vessels 46a and 47a. These vessels are heated by means of steam coils 46b and 47b to insure an easier and quicker discharge of the wax. The oil, discharged through channels 48 and over the edge of the disc 49, contains, by reason of the intentionally comparatively poor efficiency of the bowl as an oil separator, a certain proportion of wax, and such waxy oil may be mixed with the mixture flowing toward the first separator 21.

The solution in which the paraffin particles are suspended consists, according to Patent No. 1,676,069, of oil and an additional liquid. It is desirable that as small a quantity as possible of oil shall discharge with the separated paraffin, but it is impossible to avoid the discharge with the paraffin particles of a small proportion of oil. According to the present process this proportion may be reduced by adding a liquid to the concentrate obtained in the first separation. The solution of oil-additional liquid in this way becomes poorer in oil, and consequently a smaller proportion of oil discharges together with the paraffin in the following separation. It is true that the viscosity of the paraffin thereby becomes higher, but in the present process it can be without difficulty discharged from the bowl after the second separation. The carrier liquid should be added to the concentrate already in the collecting vessels of the centrifuge, so as to make the concentrate, which has often a rather high viscosity, more easily flow out of the same, and to enable a good mixing of the said liquid and the concentrate. It is, however, possible to attain a still better mixing and better flushing of the collecting vessel by feeding in the additional liquid against the bowl in such a manner that the contact therewith causes it to be thrown out into the collecting vessel.

In Fig. 5 an arrangement for practicing this modification of my process is illustrated. This arrangement is the same as that shown in Fig. 1 except that between separators 21 and 25 is inserted a mixer 30 consisting, for example, of a tank provided with a stirring device or agitator in the form of a vertical shaft with wings 31. The wax concentrate from separator 21 and the additional liquid are fed into the mixer 30, whence the mixture flows into separator 25. The two bowls required for carrying out the process may be, of course, driven from the same mechanism and may even be arranged on the same spindle, in which case they may be entirely or partly built together.

While I have hereinbefore described the process as applied to the separation of paraffin from mineral oil, it will be understood that the term "paraffin" should be construed generically to include any hydrocarbon that will, with sufficient cooling, precipitate from a fluid hydrocarbon so as to be separable therefrom by centrifugal force. By a "hydrocarbon solution" I mean to include any solution of such fluid hydrocarbon with one or more other liquids including a high specific gravity liquid such as described in said Backlund patent.

I am aware that it is known to add a diluting liquid, such as naphtha, to wax-bearing oil in order to obtain an oil-naphtha solution which is so substantially lighter than the wax that separation of oil and wax is facilitated; and also that it is known, in this naphtha dilution process, to first, in one centrifuge, separate wax, substantially free from oil, from a waxy oil, and then, after further chilling the waxy oil, separate oily wax from oil substantially free from wax. Such process, however, quite aside from the difficulty of removing the wax, as the heavier separated constituent, from the zone that it occupies in the centrifuge, is much less economical than my improved process. In any ordinary mixture of oil and wax, the oil constitutes by far the major proportion of the mixture. A 20% wax content may be regarded as distinctly high. Assuming that it is possible, in the first step of the old process, to effect a clean separation of wax, there remains, after the first separation, considerably more than 80% of waxy oil, requiring, for the second separating step, a centrifugal equipment of nearly the size required for the first separation. In my improved process, however, by far the larger proportion of the original mixture is separated as a wax-free oil (a final product). For example, in the assumed mixture, 70% of the original mixture is recovered as wax-free oil, leaving only 30% of the original mixture to be treated in the second separation. Thus the separating equipment required in the second separating step, instead of being nearly the same size as that of the equipment provided for the first separating step, is very much smaller, thereby enabling the same ultimate separation to be effected with much greater economy, aside and apart from the increased efficiency of the process.

What I claim and desire to protect by Letters Patent is:

1. In the separation of a mixture of paraffin, which has been precipitated by chilling, and a solution of hydrocarbon oil and a solvent therefor of a specific gravity so high that the solution is of substantially higher specific gravity than the paraffin, wherein centrifugal force is so applied to said mixture as to effect a substantial separation of said constituent of higher specific gravity from said constituent of lower specific gravity, the improvement which comprises carrying out said centrifugal separation in such manner as to separate, as the high specific gravity constituent, the solution, as free as possible from paraffin, from paraffin having admixed with it a considerable proportion of the hydrocarbon solution and therefore constituting a comparatively low viscosity paraffin concentrate, and then, by the application of centrifugal force to said low viscosity paraffin concentrate, separating, as the low specific gravity constituent, the paraffin, as free as possible from the hydrocarbon solution and therefore of comparatively high viscosity, from the high specific gravity hydrocarbon solution containing considerable paraffin, thereby obtaining, in the order specified, substantially paraffin-free oil and substantially oil-free paraffin.

2. The process set forth in claim 1 wherein the solvent used to form said solution with the oil is a preferential solvent for the oil.

3. The process set forth in claim 1 wherein the last named separated constituent is subsequently subjected to the first centrifugal operation specified.

4. A process in accordance with claim 1 wherein, in the first centrifugal operation, the mixture undergoing separation is divided into a multiplicity of separate laminae or strata while in the second centrifugal operation the mixture is separated in a comparatively open space.

GUSTAV HARRY ANDERSSON